No. 788,989. PATENTED MAY 2, 1905.
A. L. ALLEN.
VEGETABLE OR FRUIT PARER AND SLICER.
APPLICATION FILED DEC. 14, 1904.

Witnesses.
Robert Corritt,
James L. Norris, Jr.

Inventor.
Albert L. Allen,
By James L. Norris,
Atty.

No. 788,989. Patented May 2, 1905.

UNITED STATES PATENT OFFICE.

ALBERT L. ALLEN, OF PITTSBURG, PENNSYLVANIA.

VEGETABLE OR FRUIT PARER AND SLICER.

SPECIFICATION forming part of Letters Patent No. 788,989, dated May 2, 1905.

Application filed December 14, 1904. Serial No. 236,830.

*To all whom it may concern:*

Be it known that I, ALBERT L. ALLEN, a citizen of the United States, residing at Pittsburg, in the county of Allegheny and State of Pennsylvania, have invented new and useful Improvements in Vegetable or Fruit Parers and Slicers, of which the following is a specification.

This invention relates to an improved vegetable or fruit parer and slicer, and aims to provide an efficient device of such class particularly adapted for the paring and slicing of vegetables or fruits, the removing of the eyes from vegetables and fruits, and for the removing of cores from fruits.

The invention further aims to provide a kitchen article of the character referred to which shall be simple in its construction, strong, durable, efficient in its use, and comparatively inexpensive to manufacture.

With the foregoing and other objects in view the invention consists of the novel construction, combination, and arrangement of parts hereinafter more specifically described, and illustrated in the accompanying drawings, which form a part of this specification, and wherein is shown the preferred embodiment of the invention; but it is to be understood that changes, variations, and modifications can be resorted to which come fully within the scope of the claim hereunto appended.

In describing the invention in detail reference is had to the accompanying drawings, in which—

Figure 1:
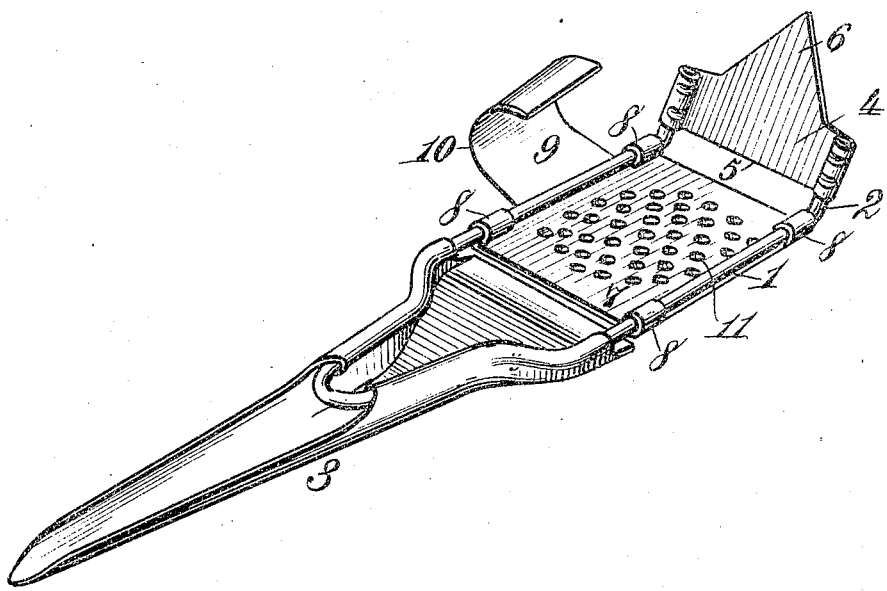
Figure 2:
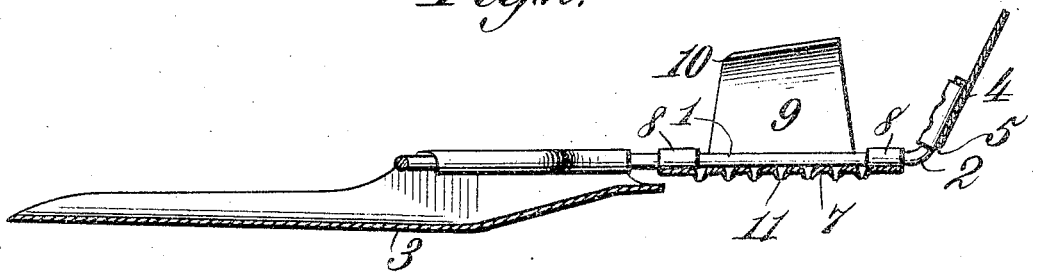

Figure 1 is a perspective view of a device of the class referred to constructed in accordance with this invention, and Fig. 2 is a sectional view.

Referring to the drawings by reference characters, 1 denotes the body portion of the device, which is in the form of a wire frame disconnected at one end, with the free ends of the wire which forms the frame bent upwardly at an inclination, as at 2. The frame at its other end is contracted and has secured thereto the handle 3, which is substantially oval shape in cross-section and tapers toward its free end. By constructing the handle 3 in such manner it forms a corer for fruits and can also be used as a means for scaling fish as well as utilizing its free end for removing the eyes from pineapples.

The device is provided with a pair of slicers, one of which is adapted to pare the fruit or vegetable, as well as slice it, and the other of which is adapted to slice the fruit or vegetable.

The combined parer and slicer when used for slicing potatoes can slice them in the form known as "Saratoga chips" as well as slicing the potatoes in the form used for "German fried," and the other slicer is adapted to slice the potatoes in the form for "French fried."

The combined parer and slicer is indicated by the reference character 4 and extends at an inclination and is secured to the inclined ends 2 of the frame 1. The combined slicer and parer 4 is provided with a cutting edge 5 and is further provided with a V-shaped projection 6, adapted to be used to remove the eyes from a potato. Arranged in operative relation with respect to the cutting edge of the combined slicer and parer 4 is a gage-plate 7, having two pairs of laterally-extending lips 8, which are adapted to be bent around the body portion 1, so as to cause a frictional connection between said gage 7 and said body portion 1. The gage 7 is adjustable to and from the cutting edge 5 of the combined parer and slicer 4, so as to regulate the width of the slice when employing said combined parer and slicer 4. The frictional contact between the lips 8 and the body portion 1 retains the gage 7 in the position set. Suitable provision is made between the inner end of the handle 3 and the body portion so that said gage can be adjusted along the body portion with respect to the cutting edge of the combined parer and slicer 4.

The slicer used for cutting the potato in the form for French fried is indicated by the reference character 9, provided with a cutting edge 10, is curvilinear in contour, and extends laterally from one side of the gage 7.

The gage 7 is swaged, as at 11, so as to have its lower face form a grater to be used for any purpose for which it is applicable.

By securing the combined slicer and parer 4 to the inclined ends 2 of the body portion 1 said combined slicer and parer is arranged at an inclination with respect to the gage 7, and when using the same to pare or slice an article the handle is grasped and preferably the slicer or parer is drawn toward the operator, and the same operation is had when using the slicer 9.

It will be apparent that the handle 3 has at its enlarged end the side edges thereof bent to engage the contracted portion of the frame or body portion 1, thereby reinforcing the said frame at this particular point and also forming shoulders, so that the operator can actuate said device. Furthermore, the surface of the handle being arranged below the frame allows the said handle to form a receptacle to receive the grated materials from the slidable gage having the grater.

Having thus fully described my invention, what I claim as new, and desire to secure by Letters Patent, is—

A device of the class described, including a frame having side bars, a cutter mounted at the terminals of said bars, a contracted portion forming shoulders on the frame, a handle having its side edges engaging said contracted portion and forming the corer, said handle also provided with a cutting edge opposite said first-mentioned cutter, and a slidable gage having a grater on said bars and intermediate said cutter edges for regulating the thickness of the slice cut by one of said cutter edges.

In testimony whereof I have hereunto set my hand in presence of two subscribing witnesses.

ALBERT L. ALLEN.

Witnesses:
N. L. BOGAN,
GEO. W. REA.